July 22, 1969  V. E. BROOKS  3,456,442
AUTOMATIC NEUTRAL VALVE
Filed July 26, 1967  2 Sheets-Sheet 1

INVENTOR.
VERN E. BROOKS
BY Teagno & Toddy

ATTORNEY

July 22, 1969  V. E. BROOKS  3,456,442
AUTOMATIC NEUTRAL VALVE
Filed July 26, 1967  2 Sheets-Sheet 2
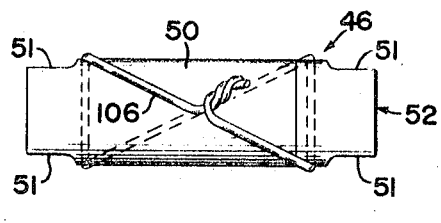
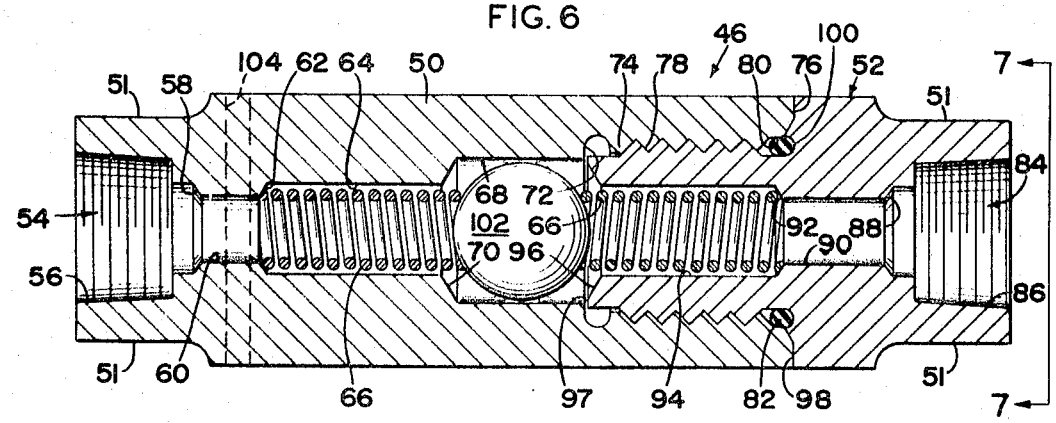
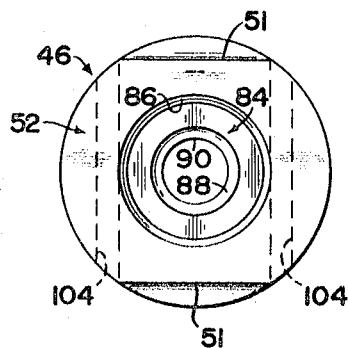
INVENTOR.
VERN E. BROOKS
BY
ATTORNEY

United States Patent Office 3,456,442
Patented July 22, 1969

3,456,442
AUTOMATIC NEUTRAL VALVE
Vern E. Brooks, Warren, Mich., assignor to Eaton Yale
 & Towne Inc., Cleveland, Ohio, a corporation of
 Ohio
Filed July 26, 1967, Ser. No. 656,201
Int. Cl. F16h *39/46;* F16k *15/04, 17/26*
U.S. Cl. 60—52                                          2 Claims

ABSTRACT OF THE DISCLOSURE

Neutral valve for hydrostatic transmission. The valve includes a body and cap defining a ball cavity with opposing ball seats and opposing springs engaging the ball, tending to keep the ball from seating at low flow. When the ball is subject to a pressure difference due to flow therearound creating a predetermined force sufficient to overcome the force of one of the springs, the ball will move to seated position. The valve has a particular configuration providing some chatter when the ball seats, thus providing the effect of a slow closing valve. This valve overcomes the precise requirement of setting a control handle to exact neutral, and automatically provides positive neutral over a selected, low fluid flow range and by-passes such low flow back to the pump inlet, thus providing for increased safety and ease of operation.

---

This invention relates to fluid flow control valves, and more particularly to a valve for automatically establishing a neutral position in a hydrostatic transmission system.

Hydrostatic power transmission is analogous to rheostat control of a direct current electric motor. Infinite speed control from zero through the entire speed range is possible. For small tractors of the garden type, snow plows, golf cars and other light vehicles, it is an ideal and very versatile power transmission system.

A hydrostatic transmission includes a hydraulic pump and motor, e.g. a tilting head or wobble plate piston pump and a piston motor, connected by conduits. The entire system is filled with incompressible fluid, thus providing a positive connection between the pump and motor.

A prime mover such as a gasoline engine is connected in driving relation to the input shaft of the pump. Power flow from pump to motor is by hydraulic fluid. The output shaft of the motor is connected in driving relation to the drive wheels of the vehicle. By this arrangement the prime mover can be set to operate at optimum r.p.m. for greatest efficiency. With the prime mover so operating, the degree of power utilized by the transmission is determined by the setting of the tilting head of the pump.

Depending upon the setting of the tilting head of the pump, it can force the motor to move forward or backward. Thus, when fluid is flowing in the hydraulic circuit, the motor is positively driven. When the tilting head is set at its maximum angle in one direction, giving maximum oil delivery in one direction to the motor, the vehicle is propelled forwardly at the maximum rate.

With the pump tilting head set at the maximum angle in the opposite direction, maximum oil flow is again obtained, but in the opposite direction of the circuit; and the vehicle is propelled backwardly at the maximum rate. By permitting complete selectivity of pump angle settings, the combination of power and speed which may be obtained in either forward or reverse directions may become infinite.

With the tilting head of the pump set ot 0°, and the pump input shaft still driven by a prime mover, the pump pistons have no stroke. No oil delivery takes place to the pump. Therefore, the motor drive shaft is theoretically stationary and hydraulically locked.

The problem, however, is how to positively neutralize the drive under actual operating conditions.

The problem arises in the fact that the control lever for setting the tilting head of the pump, is hand operated Due to wear, slip and lost motion in the control linkages, the location of the neutral position may be somewhat painstaking. Thus, in many instances in a vehicle equipped with a hydrostatic transmission, there will normally be some degree of fluid flow, and therefore some creep of the vehicle, either forwards or backwards, in any attemped neutral setting of the hand control lever thus causing a potential unsafe condition.

Extrapolate this to actual operating conditions. Thus, the operator is driving a golf car. During the operation of the car, for purposes of making a golf shot, a dead stop must be made. However, due to the difficulty of attaining a neutral setting, there is usually some forward or reverse creep. This means that it is very unsafe for the driver to dismount and leave the vehicle unattended without completely shutting down the power unit. To the skilled artisan, this is inconvenient, and the average person will not do this. The result may be accidents and injuries from moving, unattended vehicles.

Therefore, a means for providing automatic neutral within a substantial fluid flow range around the neutral point of a tilting head piston pump, or wobble plate pump-actuated hydrostatic transmission would provide a substantial advancement to the art.

Objects, therefore of the present invention are to provide a novel neutral valve for a hydrostatic system such as a transmission.

My invention provides a substantial contribution to the operation of hydrostatic transmission systems, by providing an improved, simplified and trouble-free hydraulic system wherein a novel neutral valve provides an automatic neutral under practical conditions of operation. The structure is characterized by few parts and simplicity of manufacture. The present invention provides an automatic neutral setting for the hydrostatic transmission under conditions of low fluid flow and within a selected flow range. The invention therefore provides an improved safety feature against undesirable positive-drive creeping and permits free-wheeling of the vehicle in a neutral position.

I have thus outlined the general nature of my invention and its relation to the prior art in order that the following description may be better understood, and in order that my contributions to the art can be better appreciated. There are, of course, additional features of the invention that will be described hereinafter and which will form the subject matter of the claims. Those skilled in the art will appreciate that the conception upon which the disclosure is based may be utilized as the basis for other structures for carrying out the several purposes of the invention. It is important, therefore, that the claims granted shall be construed sufficiently broadly to prevent the appropriation of the invention by others skilled in the art.

FIGURE 5 is an elevational view of the automatic neutral valve of the invention;

FIGURE 6 is an enlarged sectional view of the neutral valve of the invention; and FIGURE 7 is an end elevational view taken along the line 7—7 of FIGURE 6.

Figure 1:
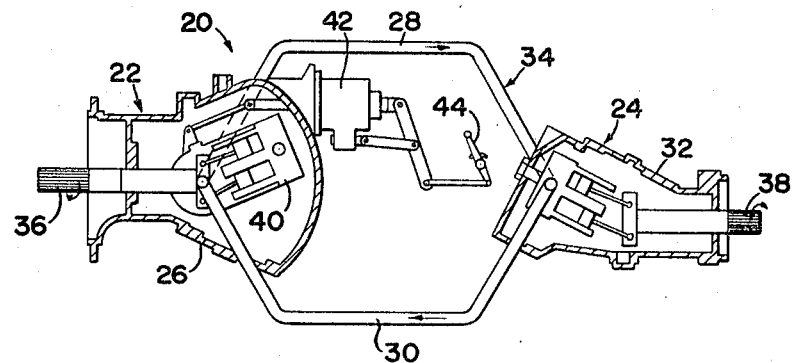
FIGURE 1 is a schematic view, for purposes of illustrating the environment for the valve of invention, showing a hydrostatic transmission using a tilting head pump, with the head set to provide maximum oil delivery in one direction.

Referring now more specifically to the drawings, and more especially to FIGURE 1, the reference numeral 20 represents a hydrostatic transmission. The transmission 20 includes a pump 22 connected to a motor 24. The pump 22 is of the variable displacement type and is mounted within a casing 26 which functions as a sump for return hydraulic fluid from the motor 24. The motor 24 is of the fixed displacement type. The pump 22 is connected by means of lines 28 and 30 to the motor 24, which is mounted within a casing 32. This arrangement of pump 22 and motor 24 and the connecting lines 28 and 30 provides a hydraulic circuit 34.

The pump 22 and motor 24 for purpose of illustration are both of the piston type, and in this instance are of equal capacity. Within the extended scope of the invention, however, the motor can be supplied at a fixed angle of less than the 25° illustrated, i.e., with reduced displacement. This will be effective to provide higher output speeds.

The hydraulic circuit 34 is filled with incompressible hydraulic fluid. There is provided, therefore, a positive connection and flow of power from the pump 22 to the motor 24 due to passage of the hydraulic fluid through the lines 28 and 30, comprised within the circuit 34.

A prime mover, not shown, such as a gasoline engine, is connected in driving relationship to an input shaft 36 of the pump 22. An output shaft 38 of the motor 24 is connected in driving relation to the driving wheels of a vehicle, not shown.

Figure 2:
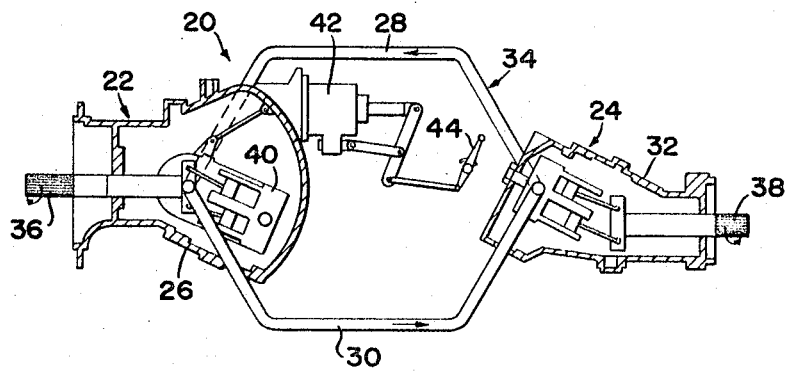
FIGURE 2 is a view similar to FIGURE 1, but with the pump set to provide maximum oil delivery in the opposite direction.

The pump 22 has a tilting head 40 which is moveable within the extreme limits illustrated in FIGURES 1 and 2. By this arrangement, the prime mover can be set to operate at optimum r.p.m. for greatest overall transmission efficiency. With the prime mover so operating, the degree of power utilized by the transmission 20 is determined by the setting of the tilting head 40 of the pump 22.

Variations of the angle of the tilting head 40, which determine the output flow from the pump 22, are achieved by a hydraulic servo jack 42. The hydraulic servo jack 42 is manipulated by a shift lever 44. This gives rise to the problem discussed above since even though the shift lever 44 may be provided with a neutral setting designation, wear and tolerance in the shift linkage in conjunction with pump setting sensitivity may cause the operator difficulty in locating the neutral position.

The motor 24 incorporates a valve block, not shown, which contains the low pressure circuit valves and a high pressure relief valve. The high pressure relief valve can be operated by the shift lever 44 into its neutral position but this operation imposes high shock loads on the system. Thus, this method of control has been found to be cumbersome and generally undesirable. It will be evident to the skilled artisan that in shifting from reverse to forward and vice versa, the high pressure relief valve will be actuated each time. This causes undue wear, shock loads and jerky operation of the vehicle.

As shown in FIGURE 1, the tilting head 40 is set at its maximum angle in one direction. This is, for example, forward drive. This causes the pump 22 to send fluid through the line 28, in the arrow direction, to the motor 24 and gives maximum oil delivery to drive the motor in one direction. The return oil from the motor 24 passes through line 30, in the arrow direction, back to the pump.

As shown in FIGURE 2, the tilting head 40 of the pump 22 is set at its maximum angle in the opposite direction. This is, for example, reverse drive. This causes the pump 22 to send fluid through the line 30 in the arrow direction, and gives maximum oil delivery to the motor 24 in the opposite direction from FIGURE 1. The oil returns from the motor 24 through the line 28 to the pump 22 in the arrow direction indicated, back to the sump 26.

Between these two extremes of either forward or reverse, there are infinite variations depending upon the setting of the hydraulic servo jack 40 by means of the shift lever 44.

Figure 3:
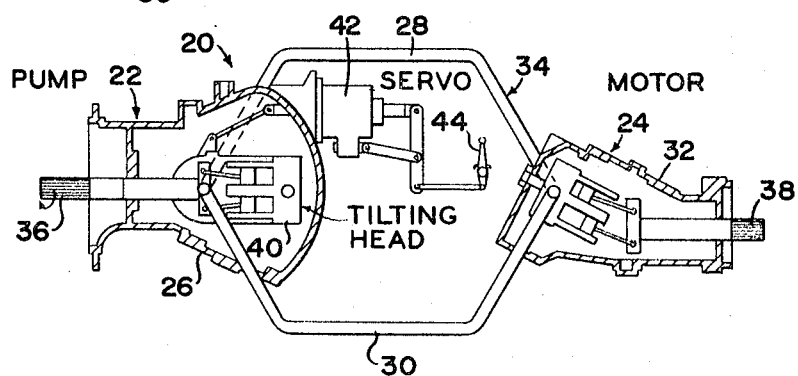
FIGURE 3 is a view similar to FIGURES 1 and 2, but showing the pump set at 0° for a theoretical neutral, thus illustrating the problem which has been overcome by the present invention.

In FIGURE 3 the tilting head 40 of the pump 22 is set at 0°. The pistons theoretically have no stroke and theoretically there is no oil delivery taking place. The output drive shaft 38 of the motor 24 should be stationary. However, as mentioned above, it is as a practical matter very difficult for an operator to adjust the shift lever 44 to positive neutral.

Figure 4:
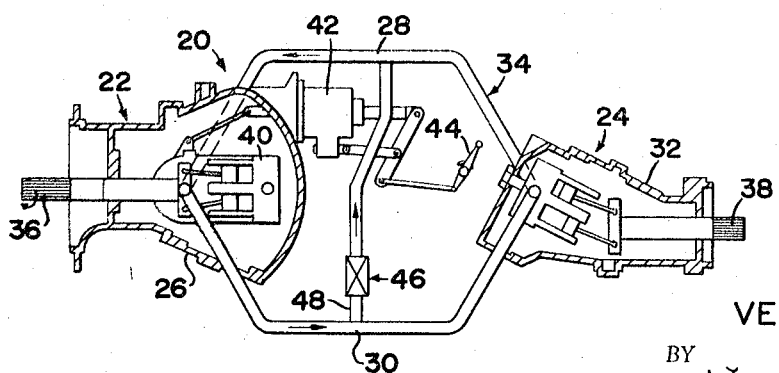
FIGURE 4 is a schematic view similar to FIGURES 1, 2 and 3, but with the hydraulic circuit altered and the automatic neutral valve of the invention interposed in the system.

In accordance with the present invention, an automatic neutral valve 46 is provided in a modification to the hydraulic circuit 34, as shown in FIGURE 4. Thus, a by-pass line 48 is connected between the pump inlet and outlet, i.e., between the lines 28 and 30, and the automatic neutral valve 46 is placed in the by-pass line.

The automatic neutral valve 46, as will be made clear from the following description, is operable to by-pass fluid back to the pump 22 over a low fluid flow range. Therefore, oil flow to the motor 24 is circumvented as long as the neutral valve 46 is operating in by-pass position. It will be evident that the valve 46 should preferably be operable in either direction of oil flow in order to obtain the desired features provided thereby in either the forward or reverse mode of vehicle operation.

Accordingly, the driver-operator of the vehicle can attain a positive neutral setting, i.e., a condition of no oil flow to the motor 24, by merely placing the control handle 44 in a generally neutral position. This, then, is effective to make the operation of the transmission easily and safely controllable. The operator can busy himself with the task at hand and at guiding the vehicle and, when a stop is desired, it can be positively and efficiently attained by "feel" without the operator taking his eyes from obstacles in the path of the vehicle, or from otherwise diverting his attention from the movement of the vehicle.

It will be evident to the artisan that a substantial advancement is thereby provided to the art of hydrostatic transmission-operated vehicles.

As shown in FIGURE 5, the automatic valve 46 is a small unit. For example, FIGURE 5 may be a full size view for some installations.

Referring to FIGURE 6, the neutral valve 46 includes a body 50 and a cap 52. As shown in FIGURE 7, the exterior profile of the valve 46 may be cylindrical. This is not limiting on the invention and hexagonal or other stock can be used. Wrench flats 51 are provided at each end for assembling the device.

The body 50 includes a stepped bore 54. At the extreme left end, the bore 54 is enlarged and threaded at 56 to receive a fitting, not shown, by which the body is attached into the hydraulic circuit 34, as shown in FIGURE 4. From the threaded portion 56, the bore 54 steps down at shoulder 58 to the smallest diameter portion 60, and then enlarges again at shoulder 62 to a spring receiving portion 64. The shoulder 62 provides a rest for the left end of one of two compression springs 66.

Following the spring-receiving portion 64, the bore 54 enlarges to a ball cavity 68 at an angular ball seat shoulder 70. Continuing to the right as shown in FIGURE 6, the bore 54 then enlarges again from a radial shoulder 72 to a threaded portion 74 and then terminates at a radial shoulder 76. The threaded portion 74 receives the externally threaded portion 78 of the cap 52. Between the end of the threaded portion 74 and the terminal shoulder 76 there is a partial recess 80 for precision O-ring or other suitable seal 82.

Before describing the details of the ball cavity 68, the description of the cap 52 will be completed. Thus, the cap 52 includes a stepped bore 84, the right end of which is enlarged and threaded at 86 to receive a fitting, not shown, by which the cap is attached into the hydraulic circuit 34, as indicated in FIGURE 4 of the drawings.

Proceeding to the left, as viewed in FIGURE 6, from the threaded portion 86 the bore 84 steps down at shoulder 88 to a smallest diameter portion 90, and then enlarges again at shoulder 92 to a spring-receiving portion 94. The shoulder 92 provides a rest for the right-hand end of the second of the compression springs 66. To the left of the spring-receiving portion 94, the bore 84 terminates in an angular ball seat shoulder 96 that complements the ball cavity 68 of the body 50.

The exterior of the cap 52 includes an exterior threaded portion 78 to fit into the internally threaded portion 74 of the body 50. The exterior of the cap 52 then enlarges again and terminates at a radial shoulder 98 at the nominal outside diameter. Between the end of the externally threaded portion 78 and the terminal radial shoulder 98, there is a partial recess 100 for the precision O-ring 82. The O-ring 82 provides a positive seal between the body 50 and the cap 52.

Referring to FIGURES 5, 6, and 7 it will be noted that holes 104 are provided in both the body 50 and the cap 52. Intermediate portions of a locking wire 106 may be placed in the holes 104 and the ends twisted together. This and the threaded connection 74–78 shown in FIGURE 6, provides a positively locked and sealed unit.

Referring now to the cavity 68, the length thereof is chosen so as to provide a location for ball 102 free of both seats 70 and 96 as shown in FIGURE 6. Springs 66 are so selected that the forces exerted on the ball thereby are in equilibrium when the ball is in the above unseated location.

The diametrical dimensions of ball-receiving cavity 68 and the ball 102 are carefully calculated relative to one another to provide a small clearance for oil flow. Thus, as an example, a ⅜″ diameter ball of .375″ diameter is used in a .406″ diameter cavity 68. This provides a .031″ of clearance between the outside of the ball and the inside of the cavity 68.

In operation, the above-mentioned close clearance between the ball and cavity creates an orifice effect around the ball causing a differential pressure or pressure drop under conditions of oil flow past the ball. As the force acting on the ball as a result of the differential pressures acting thereon becomes greater than the opposing spring force, the ball will seat one one of the seat shoulders 70, 96. Since the flow is then immediately stopped, the pressure differential created by the flow is removed, and the ball tends to become unseated under the action of the spring force applied thereto. This tendency to "chatter" will remain until such time as the force acting on the ball from system pressure is sufficient to maintain the ball seated against the spring action. This pressure, dependent upon the magnitude of the spring forces and the dimensions of the valve elements, may be selected at a value below that required for vehicle operation thus providing a neutral, free-wheeling condition without loss of low-speed selectivity.

Ordinarily, the pressure range within which the springs 66 will unseat the ball to provide a neutral condition of the transmission is selected by appropriate choice of spring strengths.

"Chatter" may be desirable to create the effect of a slow-closing valve thereby providing a gradual rather than shock application of power to the motor 24. However, if "chatter" is considered undesirable, the stability of the unit may be enhanced by enlarging the dimension of bores 64, 94 with respect to cavity 68.

The present invention has been described hereinabove in considerable detail and it is to be understood that certain modifications, changes and adaptations may be made therein, and it is hereby intended to cover all such modifications, changes and adaptations coming within the scope of the appended claims.

What is claimed is:

1. In a hydrostatic transmission system
  a pump of variable capacity of the positive displacement type and control means for varying the capacity of the pump,
  means for driving the pump
  a motor of positive displacement type
  a first conduit connecting an outlet from the pump to the motor and a second conduit for connecting an inlet from the pump to the motor
  a by-pass conduit connected between the first and second conduits, and
  neutral valve means in the by-pass conduit for permitting fluid flow therethrough at low flow rates and for interrupting flow therethrough when the flow rate from the pump is above a predetermined level comprising
  a member defining a flow control passage terminating in spaced valve surfaces
  a flow control ball in the passage between the valve surfaces and moveable in response to differential pressures acting thereon caused by flow of fluid therepast, and
  means normally biasing the flow control ball away from the valve surfaces.
  said flow control ball being moveable against the action of the biasing means to seat against one of the valve surfaces so that when the pump control means is adjusted to a position only approximating neutral setting, the resulting low flow of fluid from the pump is by-passed through the neutral valve and the motor is not driven thereby.

2. A method for establishing automatic neutral in a hydrostatic transmission having a pump connected by first and second conduits to a motor for conveying fluid therebetween so that the motor remains in undriven neutral condition at a predetermined range of low pump flow rates, including the steps of
  providing a by-pass conduit between the first and second conduits and including a two-way neutral valve in said by-pass conduit, said neutral valve including a passage and a control element moveable between opposed seats in said passage and a means normally biasing said control element away from said seats to a neutral position between said seats, thereby providing flow around said control element,
  moving fluid through said circuit at a low flow rate and balancing said control element between said seats to thereby by-pass fluid from the outlet of the pump to the inlet thereof whereby fluid driving force is diverted from the motor, and increasing the flow rate and seating the control element against one of said seats in order to force fluid in one direction from the pump to the motor and thereby drive the motor.

References Cited

UNITED STATES PATENTS

| | | | |
|---|---|---|---|
| 701,754 | 6/1902 | Moran | 137—517 XR |
| 2,323,352 | 7/1943 | Pitts | 137—516.25 XR |
| 2,526,570 | 10/1950 | Majneri | 137—516.25 XR |
| 2,623,725 | 12/1952 | Sands | 137—516.25 |
| 2,706,384 | 4/1955 | Schott. | |
| 2,640,323 | 6/1953 | McLeod. | |
| 3,228,184 | 1/1966 | Harbidge et al. | 137—53 XR |
| 3,376,703 | 4/1968 | Buczynski | 137—53 |

EDGAR W. GEOGHEGAN, Primary Examiner

U.S. Cl. X.R.

60—52; 103—41; 137—108, 516.25, 517